(12) United States Patent
Beer et al.

(10) Patent No.: US 8,935,114 B2
(45) Date of Patent: Jan. 13, 2015

(54) DETERMINING THE CLOSING TIME OF A FUEL INJECTION VALVE BASED ON EVALUATING THE ACTUATION VOLTAGE

(75) Inventors: Johannes Beer, Regensburg (DE); Stephan Bolz, Platter (DE)

(73) Assignee: Continental Automotive GmbH, Hannover (DE)

( * ) Notice: Subject to any disclaimer, the term of this patent is extended or adjusted under 35 U.S.C. 154(b) by 453 days.

(21) Appl. No.: 13/383,384

(22) PCT Filed: Jun. 16, 2010

(86) PCT No.: PCT/EP2010/058435
§ 371 (c)(1),
(2), (4) Date: Jan. 10, 2012

(87) PCT Pub. No.: WO2011/003704
PCT Pub. Date: Jan. 13, 2011

(65) Prior Publication Data
US 2012/0116702 A1    May 10, 2012

(30) Foreign Application Priority Data

Jul. 10, 2009  (DE) .......................... 10 2009 032 521

(51) Int. Cl.
*G06F 19/00* (2011.01)
*G01N 15/00* (2006.01)
(Continued)

(52) U.S. Cl.
CPC ................ *F02D 41/20* (2013.01); *F02D 41/40* (2013.01); *F02D 2041/2058* (2013.01);
(Continued)

(58) Field of Classification Search
CPC . F02D 41/20; F02D 2041/2055; F02D 41/40; F02D 2041/2058; H01F 2007/1861; H01F 7/1805; F16K 31/0675

USPC .............. 702/65, 150; 324/654; 73/114.49; 123/304, 305, 490, 90.11, 679, 480, 123/478, 90.16, 399; 701/102, 104, 103, 701/105, 114

See application file for complete search history.

(56) References Cited

U.S. PATENT DOCUMENTS

| | | | | |
|---|---|---|---|---|
| 4,785,779 A | * | 11/1988 | Takao et al. .............. | 123/339.22 |
| 4,921,210 A | * | 5/1990 | Hutchison et al. ........ | 251/129.08 |

(Continued)

FOREIGN PATENT DOCUMENTS

| | | | | |
|---|---|---|---|---|
| DE | 3643138 A1 | 6/1990 | ................ | B60T 8/36 |
| DE | 4011217 A1 | 10/1991 | ................ | B60T 8/36 |

(Continued)

OTHER PUBLICATIONS

International PCT Search Report and Written Opinion, PCT/EP2010/058435, 18 pages, Sep. 14, 2010.

*Primary Examiner* — Carol S Tsai
(74) *Attorney, Agent, or Firm* — King & Spalding L.L.P.

(57) ABSTRACT

A method for determining a closing time of a valve having a coil drive, in particular a direct injection valve for an engine of a motor vehicle, has the steps: (a) switching off a current flow through a coil (L_inj) of the coil drive, so that the coil (L_inj) is depowered, (b) capturing a time curve (110) of a voltage induced in the non-powered coil (L_inj), wherein the induced voltage is generated by decaying eddy currents in a magnetic circuit of the coil drive and by a motion of the armature relative to the coil (L_inj), (c) evaluating the captured time curve (110) of the voltage induced in the coil (L_inj), and (d) determining the closing time based on the evaluated time curve (110). A corresponding device and a computer program for determining the closing time of a valve with a coil drive can be provided accordingly.

18 Claims, 6 Drawing Sheets

(51) Int. Cl.
*G01R 27/28* (2006.01)
*F02D 41/20* (2006.01)
*F02D 41/40* (2006.01)
*F16K 31/06* (2006.01)
*H01F 7/18* (2006.01)

(52) U.S. Cl.
CPC .......... *F16K 31/0675* (2013.01); *H01F 7/1805* (2013.01); *F02D 2041/2055* (2013.01); *H01F 2007/1861* (2013.01)
USPC .......... 702/65; 702/150; 324/654; 123/90.11; 701/114; 73/114.49

(56) References Cited

U.S. PATENT DOCUMENTS

| | | | | |
|---|---|---|---|---|
| 4,997,161 | A * | 3/1991 | Hutchison et al. | 251/129.08 |
| 5,182,517 | A | 1/1993 | Thelen et al. | 324/418 |
| 5,775,276 | A * | 7/1998 | Yanai et al. | 123/90.11 |
| 5,880,920 | A | 3/1999 | Fischer et al. | 361/187 |
| 5,915,347 | A * | 6/1999 | Yanai et al. | 123/90.11 |
| 5,931,136 | A * | 8/1999 | Isobe et al. | 123/399 |
| 6,820,595 | B2 * | 11/2004 | Kobayashi et al. | 123/478 |
| 6,949,923 | B2 | 9/2005 | Schultz et al. | 324/207.18 |
| 7,293,555 | B2 * | 11/2007 | Kato et al. | 123/679 |
| 7,415,950 | B2 * | 8/2008 | Ervin et al. | 123/90.11 |
| 7,454,299 | B2 | 11/2008 | Bolz | 702/64 |
| 7,832,378 | B2 * | 11/2010 | Bolz | 123/490 |
| 8,019,569 | B2 * | 9/2011 | Bolz | 702/150 |
| 8,132,548 | B2 * | 3/2012 | Ervin et al. | 123/90.11 |
| 2002/0112682 | A1 * | 8/2002 | Koch | 123/90.11 |
| 2004/0107946 | A1 * | 6/2004 | Kobayashi et al. | 123/480 |
| 2007/0074709 | A1 * | 4/2007 | Kato et al. | 123/679 |
| 2008/0178827 | A1 * | 7/2008 | Ervin et al. | 123/90.11 |
| 2009/0126692 | A1 * | 5/2009 | Bolz | 123/490 |
| 2010/0193036 | A1 * | 8/2010 | Haggenmiller et al. | 137/1 |
| 2011/0120423 | A1 * | 5/2011 | Borchsenius et al. | 123/494 |

FOREIGN PATENT DOCUMENTS

| | | | |
|---|---|---|---|
| DE | 4308811 A1 | 1/1994 | F02D 41/20 |
| DE | 1961185 A1 | 10/1997 | H01F 7/16 |
| DE | 19834405 A1 | 2/2000 | F02D 41/20 |
| DE | 10108425 C1 | 6/2002 | A61M 16/20 |
| DE | 10062107 C1 | 7/2002 | F01L 9/04 |
| DE | 10150199 A1 | 4/2003 | H01F 7/18 |
| DE | 10356858 A1 | 7/2005 | F02D 41/20 |
| DE | 102006035225 A1 | 2/2007 | H01F 7/122 |
| DE | 102005044886 A1 | 4/2007 | F02D 41/20 |
| EP | 1302952 A2 | 10/2002 | H01F 7/18 |
| EP | 1777400 A2 | 9/2006 | F02D 41/22 |
| GB | 2320522 A * | 6/1998 | |
| WO | 2010/023104 A1 | 3/2010 | F02D 41/22 |

* cited by examiner

DETERMINING THE CLOSING TIME OF A FUEL INJECTION VALVE BASED ON EVALUATING THE ACTUATION VOLTAGE

CROSS-REFERENCE TO RELATED APPLICATIONS

This application is a U.S. National Stage Application of International Application No. PCT/EP2010/058435 filed Jun. 16, 2010, which designates the United States of America, and claims priority to German Application No. 10 2009 032 521.2 filed Jul. 10, 2009, the contents of which are hereby incorporated by reference in their entirety.

TECHNICAL FIELD

The present invention relates to the technical field of the actuation of coil drives for a valve, in particular for a direct injection valve for an internal combustion engine of a motor vehicle. The present invention relates, in particular, to a method for determining the closing time of a valve having a coil drive. The present invention also relates to a corresponding device and to a computer program for determining the closing time of a valve having a coil drive.

BACKGROUND

For the purpose of operating modern internal combustion engines and ensuring compliance with strict emission limiting values, an engine controller determines, by means of what is referred to as a cylinder charge model, the air mass which is enclosed in a cylinder per working cycle. The appropriate fuel quantity setpoint value (MFF_SP) is injected via an injection valve, also referred to in this document as an injector, in accordance with the modeled air mass and the desired ratio between the air quantity and the fuel quantity (lambda). In this way, the fuel quantity to be injected can be dimensioned in such a way that a lambda value which is optimum for the exhaust gas post-treatment in the catalytic converter is present. For direct-injection spark ignition engines with internal mixture formation, the fuel is injected directly into the combustion chamber at a pressure in the range from 40 to 200 bar.

The main requirement made of the injection valve is, in addition to the seal with respect to an uncontrolled outflow of fuel and the conditioning of the jet of the fuel to be injected, precisely timed metering of the pilot-controlled injection quantity.

In particular in the case of supercharged direct-injection spark ignition engines, a very large quantity spread of the required fuel quantity is necessary. It is therefore necessary, for example for the supercharged operating mode at the full load of the engine, to meter a maximum fuel quantity MFF_max per working cycle, while in the operating mode near to idling a minimum fuel quantity MFF_min has to be metered. The two characteristic variables MFF_max and MFF_min define here the limits of the linear working range of the injection valve. This means that there is a linear relationship between the injection time (electrical actuation period (Ti)) and the injected fuel quantity per working cycle (MFF) for these injection quantities.

For direct injection valves with a coil drive, the quantity spread, which is defined as the quotient between the maximum fuel quantity MFF_max and the minimum fuel quantity MFF_min when the fuel pressure is constant, is approximately 15. For future engines with the emphasis on $CO_2$ reduction, the cubic capacity of the engines is reduced and the rated power of the engine is maintained or even increased by means of corresponding engine charging mechanisms. As a result, the demands which are made of the maximum fuel quantity MFF_max correspond at least to the demands made of an induction engine with a relatively large cubic capacity. However, the minimum fuel quantity MFF_min is determined, and therefore reduced, by means of operation near to idling and the minimum mass of air under overrun conditions of the engine with a reduced cubic capacity. In addition, direct injection permits the entire fuel mass to be distributed over a plurality of pulses, which, for example in a catalytic converter heating mode, permits more stringent emission limiting values to be complied with by what is referred to as mixture stratification and a later ignition time. For the above-mentioned reasons, for future engines increased demands will be made both of the quantity spread and also of the minimum fuel quantity MFF_min.

In known injection systems, a significant deviation of the injection quantity from the nominal injection quantity occurs in the case of injection quantities which are smaller than MFF_min. This systematically occurring deviation is due essentially to fabrication tolerances at the injector and to tolerances of the output stage, which actuates the injector, in the engine controller, and therefore to deviations from the nominal actuation current profile.

The electrical actuation of a direct injection valve typically takes place by means of a current-controlled full-bridge output stage. Only a limited level of accuracy of the current profile which is applied to the injector can be achieved under the peripheral conditions of a vehicle application. The resulting variation in the actuation current, and the tolerances at the injector, have significant effects on the achievable accuracy of the injection quantity, in particular in the region of MFF_min and below.

The characteristic curve of an injection valve defines the relationship between the injected fuel quantity MFF and the time period Ti of the electrical actuation (MFF=f(Ti)). The inversion of this relationship Ti=g(MFF_SP) is used in the engine controller to convert the setpoint fuel quantity (MFF_SP) into the necessary injection time. The additional influencing variables which are included in this calculation, such as the fuel pressure, the internal pressure of a cylinder during the injection process, as well as possible variations in the supply voltage, are omitted here for the sake of simplification.

Figure 7A:
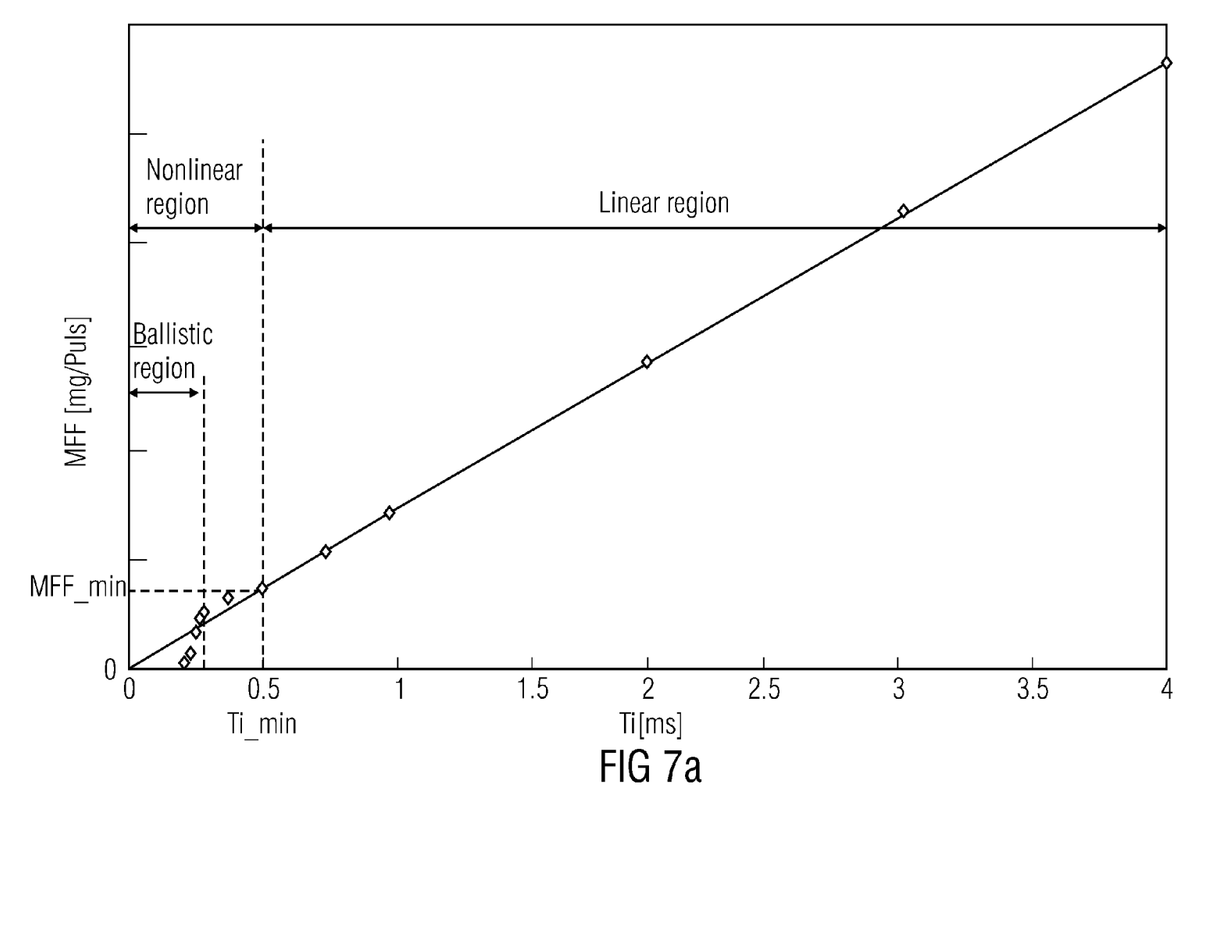
FIG. 7*a* shows the characteristic curve of a known direct injection valve, illustrated in a diagram, in which the injected fuel quantity MFF is plotted as a function of the duration Ti of the electrical actuation.

FIG. 7a shows the characteristic curve of a direct injection valve. Here, the injected fuel quantity MFF is plotted as a function of the time period Ti of the electrical actuation.

As is apparent from FIG. 7a, for time periods Ti which are greater than Ti_min there is a working range which is linear to a very good approximation. This means that the injected fuel quantity MFF is directly proportional to the time period Ti of the electrical actuation. For time periods Ti which are shorter than Ti_min there is a highly nonlinear behavior. In the illustrated example, Ti_min is approximately 0.5 ms.

The gradient of the characteristic curve in the linear working range corresponds to the static flow through the injection valve, i.e. the fuel flow rate, which is continuously attained during the entire valve stroke. The cause of the nonlinear behavior for time periods Ti which are shorter than approximately 0.5 ms or for fuel quantities MFF<MFF_min is, in particular, in the inertia of an injector spring-mass system and the chronological behavior during the building up or reduction of the magnetic field by a coil, which magnetic field activates the valve needle of the injection valve. As a result of these dynamic effects, the entire valve stroke is no longer achieved in what is referred to as the ballistic range. This means that the valve is closed again before the structurally predefined final position, which defines the maximum valve stroke, has been reached.

In order to ensure a defined and reproducible injection quantity, direct injection valves are usually operated in a linear working range. At present, operation in the nonlinear range is not possible since, owing to the above-mentioned tolerances in the current profile and mechanical tolerances of injection valves (for example the prestressing force of the closing spring, stroke of the valve needle, internal friction in the armature/needle system), a significant systematic error occurs in the injection quantity. For reliable operation of an injection valve, this results in a minimum fuel quantity MFF_min per injection pulse, which minimum fuel quantity MFF_min has to at least be provided in order to be able to implement the desired injection quantity precisely in terms of quantity. In the example illustrated in FIG. 7a, this minimum fuel quantity MFF_min is somewhat smaller than 5 mg.

The electrical actuation of a direct injection valve usually occurs by means of current-regulated full-bridge output stages of the engine controller. A full-bridge output stage makes it possible to apply an on-board power system voltage of the motor vehicle to the injection valve, and alternatively to apply a boosting voltage thereto. The boosting voltage is frequently also referred to as boost voltage (U_boost) and can be, for example, approximately 60 V.

Figure 7B:
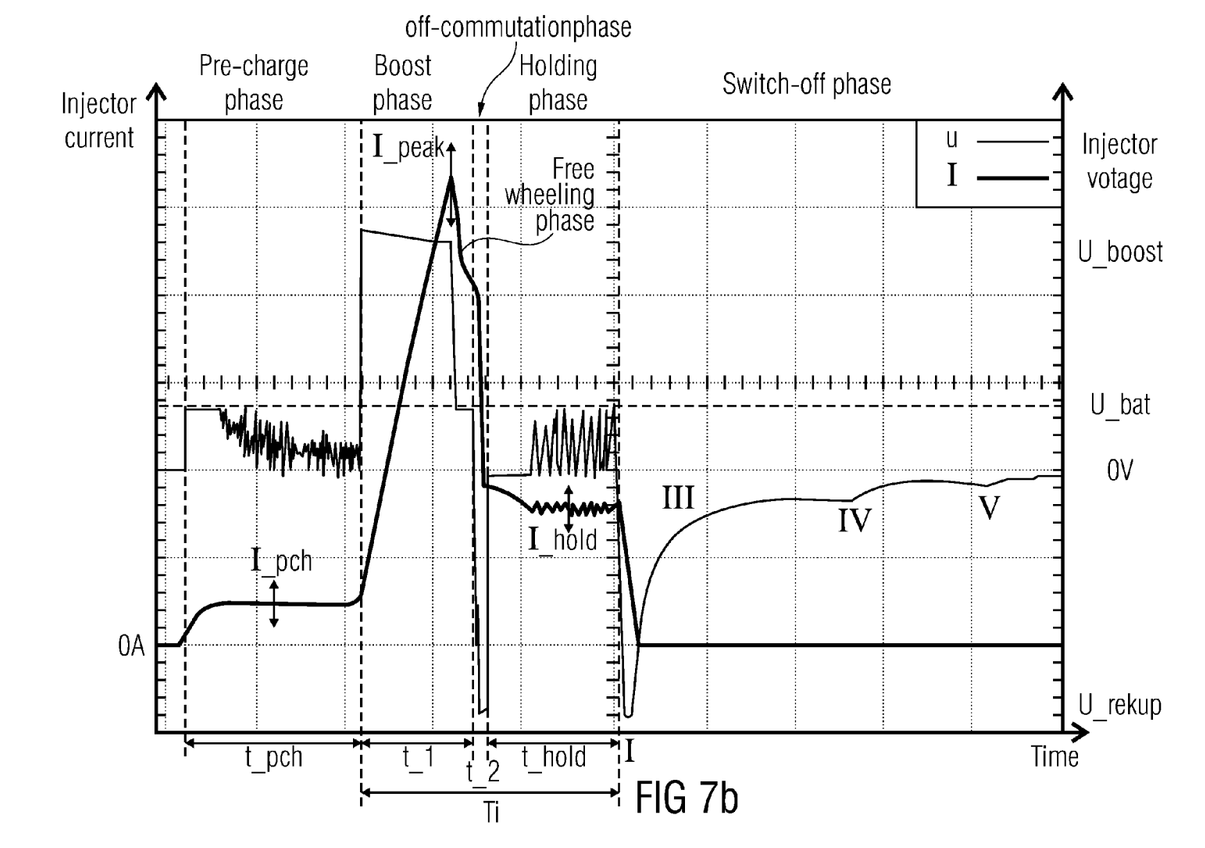
FIG. 7*b* shows a typical current actuation profile and the corresponding voltage profile for a direct injection valve with a coil drive.

FIG. 7b shows a typical current actuation profile I (thick continuous line) for a direct injection valve with a coil drive. FIG. 7b also shows the corresponding voltage U (thin continuous line) which is applied to the direct injection valve. The actuation is divided into the following phases:

A) Pre-charge phase: During this phase with a duration t_pch, the battery voltage U_bat, which corresponds to the on-board power system voltage of the motor vehicle, is applied to the coil drive of the injection valve by means of the bridge circuit of the output stage. When a current setpoint value I_pch is reached, the battery voltage U_bat is switched off by a two-point regulator, and U_bat is switched on again after a further current threshold is undershot.

B) Boost phase: The pre-charge phase is followed by the boost phase. For this purpose, the boosting voltage U_boost is applied to the coil drive by the output stage until a maximum current I_peak is reached. As a result of the rapid build up in current, the injection valve opens in an accelerated fashion. After I_peak has been reached, a freewheeling phase follows until the expiry of t_1, during which freewheeling phase the battery voltage U_bat is in turn applied to the coil drive. The time period Ti of the electrical actuation is measured starting from the beginning of the boost phase. This means that the transition to the freewheeling phase is triggered by the predefined maximum current I_peak being reached. The duration t_1 of the boost phase is permanently predefined as a function of the fuel pressure.

C) Commutation phase: After the expiry of t_1, an off-commutation phase follows. Here, a self-induction voltage, which is substantially limited to the boost voltage U_boost, is produced as a result of the switching off of the voltage. The limitation of the voltage during the self-induction is composed of the sum of U_boost, of the forward voltages of a recuperation diode and of what is referred to as a freewheeling diode. The sum of these voltages is referred to below as recuperation voltage. The recuperation voltage in the commutation phase is represented negatively on the basis of a differential voltage measurement on which FIG. 7b is based.

As a result of the recuperation voltage, a current flow occurs through the coil and reduces the magnetic field. The commutation phase is timed and depends on the battery voltage U_bat and on the duration t_1 of the boost phase. The commutation phase ends after the expiry of a further time period t_2.

D) Holding phase: The off-commutation phase is followed by what is referred to as the holding phase. Here, in turn, the holding current setpoint value I_hold is adjusted by means of the battery voltage U_bat by means of a two-point controller.

E) Switch-off phase: As a result of the voltage being switched off, a self-induction voltage occurs which, as explained above, is limited to the recuperation voltage. This results in a current flow through the coil, which current flow then reduces the magnetic field. After the recuperation voltage which is illustrated negatively here is exceeded, current no longer flows. This state is also referred to as open coil. Owing to the ohmic resistances of the magnetic material, the eddy currents which are induced when the field of the coil is reduced decay. The reduction in the eddy currents leads in turn to a change in the field in the magnetic coil and therefore to a voltage induction. This induction effect leads to a situation in which the voltage value at the injector rises to zero starting from the level of the recuperation voltage according to the profile of an exponential function. After the reduction of the magnetic force, the injector closes by means of the spring force and by means of the hydraulic force which is caused by the fuel pressure.

The described actuation of an injection valve has the disadvantage that the precise time of closing of the injection valve or of the injector in the open coil phase cannot be determined. Since a variation in the injection quantity correlates to the resulting variation in the closing time, the absence of this information, in particular at very small injection quantities which are smaller than MFF_min, results in a considerable degree of uncertainty with respect to the fuel quantity which is actually introduced into the combustion chamber of a motor vehicle engine.

SUMMARY

According to various embodiments, a method can be specified which is easy to implement, as well as a corresponding device, for determining the closing time within the switch-off phase of an injection valve.

According to an embodiment, a method for determining a closing time of a valve having a coil drive, in particular of a direct injection valve for an internal combustion engine of a motor vehicle, may comprise: switching off a current flow through a coil of the coil drive, with the result that the coil is de-energized, sensing of a time profile of a voltage which is induced in the de-energized coil, wherein the induced voltage is generated by decaying eddy currents in a magnetic circuit of the coil drive and by a movement of the magnet armature relative to the coil, evaluation of the sensed time profile of the voltage which is induced in the coil, and determination of the closing time on the basis of the evaluated time profile.

According to a further embodiment, the evaluation can be carried out within a time interval which contains the expected closing time. According to a further embodiment, the evaluation can be carried out within a further time interval which comprises a further expected closing time at which the valve is closed again after a bouncing process of the valve needle and of the associated magnet armature. According to a further embodiment, the evaluation may comprise the calculation of the derivative over time of the sensed time profile of the voltage induced in the coil. According to a further embodiment, the evaluation may comprise comparing the sensed time profile of the voltage induced in the coil with a reference voltage profile. According to a further embodiment, the reference voltage profile can be determined by sensing the voltage induced in the de-energized coil while the magnet armature is secured in the closed position of the valve, after the valve has been actuated electrically as in real operation. According to a further embodiment, the reference voltage profile can be described by parameters of a mathematical reference model. According to a further embodiment, the evaluation may comprise comparing a derivative over time of the sensed time profile of the voltage induced in the coil with a derivative over time of the reference voltage profile. According to a further embodiment, the reference voltage profile can be modeled by an electronic circuit.

According to another embodiment, a device for determining a closing time of a valve having a coil drive, in particular of a direct injection valve for an engine of a motor vehicle, may comprise a switch-off unit for switching off a current flow through a coil of the coil drive, with the result that the coil is de-energized, a sensing unit for sensing a time profile of a voltage induced in the de-energized coil, wherein the induced voltage is generated by decaying eddy currents in a magnetic circuit of the coil drive and by a movement of the magnet armature relative to the coil, and an evaluation unit configured to evaluate the sensed time profile of the voltage induced in the coil, and to determine the closing time on the basis of the evaluated time profile.

According to yet another embodiment, a computer program for determining a closing time of a valve having a coil drive, in particular of a direct injection valve for an engine of a motor vehicle, wherein the computer program, when executed by a processor, is configured to control the method as described above.

BRIEF DESCRIPTION OF THE DRAWINGS

Further advantages and features can be found in the following exemplary description of various embodiments. The individual figures of the drawing of this application are to be considered merely as being schematic and as not true to scale.

It is determined that features and components of different embodiments which are identical or at least functionally identical to the corresponding features or components of the embodiment are provided with the same reference symbols. In order to avoid unnecessary repetitions, features and components which have already been explained on the basis of a previously described embodiment will no longer be explained in detail at a later point.

DETAILED DESCRIPTION

According to a first aspect, a method for determining a closing time of a valve having a coil drive, in particular of a direct injection valve for an internal combustion engine of a motor vehicle, is described. The method comprises (a) switching off a current flow through a coil of the coil drive, with the result that the coil is de-energized, (b) sensing of a time profile of a voltage which is induced in the de-energized coil, wherein the induced voltage is generated by decaying eddy currents in a magnetic circuit of the coil drive and by a movement of the magnet armature relative to the coil, (c) evaluation of the sensed time profile of the voltage which is induced in the coil, and (d) determination of the closing time on the basis of the evaluated time profile.

The described closing time detection method is based on the realization that a voltage signal, caused by induction as a result of the movement of the magnet armature, in the coil can be used to characterize the movement sequence of the magnet armature and to determine the closing time therefrom. In this context, the voltage signal, which is caused by induction as a result of the movement owing to the remnant magnetic field of the magnet armature, in the coil is typically at its largest when the magnet armature is located directly before its stop or before its closed position. This is due to the fact that, in the de-energized state of the coil, the relative speed between the magnet armature and the coil is at a maximum directly before the stop of the moving magnet armature.

The voltage profile of the voltage which is induced in the de-energized coil is therefore determined at least partially by the movement of the magnet armature. Through suitable evaluation of the time profile of the voltage induced in the coil it is possible to determine, at least in a good approximation, the portion which is based on the relative movement between the magnet armature and the coil. In this way, information about the movement profile is also automatically acquired and permits precise conclusions to be drawn about the time of the maximum speed and therefore also about the time of the closing of the valve.

The described method has the advantage that it can be carried out online in an engine control unit. If, for example, the valve closing time changes as a result of the above-mentioned tolerances of the injection valve and of the actuation electronics, this change is detected automatically with the described closing time detection method and can be correspondingly compensated by modified actuation.

It is to be noted that when the closing time is determined on the basis of the evaluated time profile it is also possible to detect if the valve, under certain circumstances, does not at all reach its closed position. It is possible to use the described method to determine from this that the movement behavior of the valve is disrupted and, in particular, restricted. Complete undesired jamming of the valve can also be reliably detected in this way.

According to one exemplary embodiment, the evaluation is carried out within a time interval which contains the expected closing time. This has the advantage that the evaluation has been carried out only within a restricted time period, with the result that the described method can also be reliably carried out with a relatively small computing capacity. An unnecessary evaluation in time periods in which there is a high probability that the closing time does not occur can therefore be avoided.

The beginning of the time interval can be provided, for example, by the expected closing time minus a predefined time period Δt. The end of the time interval can be provided, for example, by the expected closing time plus a further predefined time period Δt'. In this context, the predefined time period Δt and the further predefined time period Δt' may be the same. Δt and Δt' should be smaller than the expected time difference, which is easy to determine experimentally, between the first closing time and a second closing time, which follows the first closing time after the bouncing of the magnet armature. This means that the second closing time lies outside the observation time window which is provided by Δt and Δt'.

According to a further exemplary embodiment, the evaluation is carried out within a further time interval which comprises a further expected closing time at which the valve is closed again after a bouncing process of the valve needle and of the associated magnet armature. This has the advantage that with the described method it is possible, in addition to the determination of the initial closing time, also to obtain information about a possibly present and typically undesired second closing process on the basis of what is referred to as bouncing.

The beginning and the end of the further time interval can be given in a corresponding way by the expected further closing time minus a predefined further time period Δt'' or plus a predefined further time period Δt'''. Here, the predefined further time periods Δt'' and/or Δt''' can be the same as or different from one another and the same as or different from the time periods Δt and Δt' which are used to define the time interval described above.

According to a further exemplary embodiment, the evaluation comprises the calculation of the derivative over time of the sensed time profile of the voltage induced in the coil. The closing time can be determined here by a local minimum, in particular in the first predefined time interval in the derivative over time of the induced voltage profile.

In a corresponding way, the further closing time described above can be determined by a further local minimum, in particular in the second predefined time interval in the derivative over time of the induced voltage profile.

According to a further exemplary embodiment, the evaluation comprises comparing the sensed time profile of the voltage induced in the coil with a reference voltage profile. The reference voltage profile can be selected here in such a way that it describes the portion of the induced voltage which is caused by decaying eddy currents in the magnetic circuit. As a result, particularly precise information about the actual movement of the magnet armature can be acquired within the scope of the evaluation of the sensed voltage profile. The comparison may comprise, for example, simple formation of differences between the voltage induced in the coil and the reference voltage profile.

According to a further exemplary embodiment, the reference voltage profile is determined by sensing the voltage induced in the de-energized coil while the magnet armature is secured in the closed position of the valve, after the valve has been actuated electrically as in real operation.

Since a movement of the magnet armature is prevented, the reference voltage profile therefore exclusively characterizes the voltage induced in the magnet armature in the coil by decaying eddy currents. During real operation, the difference between the time profile of the voltage induced in the de-energized coil and the reference voltage determined in such a way therefore represents, in a good approximation, the movement proportion of the induced voltage which is caused by the relative movement between the magnet armature and the coil. As a result, the closing time and, if appropriate, the further closing time described above (after a bouncing process) can be determined with a high level of accuracy.

According to a further exemplary embodiment, the reference voltage profile is described by parameters of a mathematical reference model.

The described method can therefore be carried out by a microcontroller which is programmed in a suitable way. No changes, or merely very small changes, are advantageously necessary to hardware, known from the prior art, for the electrical actuation of a valve.

According to a further exemplary embodiment, the evaluation comprises comparing a derivative over time of the sensed time profile of the voltage induced in the coil with a derivative over time of the reference voltage profile. In this context, for example, the difference between (a) the derivative over time of the sensed time profile of the voltage induced in the coil and (b) the derivative over time of the reference voltage profile can be calculated.

The closing time can then be determined by a local maximum or by a local minimum (depending on the sign of the formation of differences). The evaluation, which comprises both the calculation of the two derivatives over time and the formation of differences, can also be limited here to a time interval in which the expected closing time occurs. The same can apply to a further closing time which occurs under some circumstances, after a bouncing process.

According to a further exemplary embodiment, the reference voltage profile is modeled by an electronic circuit. Such an electronic circuit can have various components or modules such as, for example, a reference generator module, a subtraction module and an evaluation module.

The reference generator module may generate, for example, a reference signal which models the coil voltage, which is induced in the de-energized coil by the decaying eddy currents and decays exponentially, in a synchronous fashion with respect to the current switch-off process of the coil. The subtraction module serves to form differences between the coil voltage and the reference signal in order to eliminate the voltage portion of the coil signal which is induced by the decaying eddy currents. As a result, essentially the movement-induced portion of the coil voltage remains. The evaluation module may detect the maximum of the movement-induced portion of the coil voltage, which maximum induces the closing time of the injector.

According to a further aspect of various embodiments, a device for determining a closing time of a valve having a coil drive, in particular of a direct injection valve for an engine of a motor vehicle, is described. The described device comprises (a) a switch-off unit for switching off a current flow through a coil of the coil drive, with the result that the coil is de-energized, (b) a sensing unit for sensing a time profile of a voltage induced in the de-energized coil, wherein the induced voltage is generated by decaying eddy currents in a magnetic circuit of the coil drive and by a movement of the magnet armature relative to the coil, (c) an evaluation unit. The evaluation unit is configured to evaluate the sensed time profile of the voltage induced in the coil and to determine the closing time on the basis of the evaluated time profile.

The described apparatus is also based on the realization that a voltage signal, which is caused by induction as a result of the movement of the magnet armature and the remnant magnetism thereof, in the coil can be used to characterize the movement sequence of the magnet armature and to determine the closing time therefrom. The induced voltage signal which is assigned to the movement of the magnet armature is typically at its largest at least in what is referred to as the switch-off phase of an injection valve when the relative speed between the magnet armature and the coil is at a maximum. This is usually the case when the magnet armature is located directly before its stop or before its closed position.

According to a further aspect of various embodiments, a computer program for determining a closing time of a valve having a coil drive, in particular of a direct injection valve for an engine of a motor vehicle, is described. The computer program, when executed by a processor, is configured to control the method described above in order to determine the closing time of a valve having a coil drive.

In the sense of this document, specifying such a computer program is equivalent to the term of a program element, a computer program product or a computer-readable medium which contains instructions for controlling a computer system in order to co-ordinate the method of operation of a system or of a method in a suitable way in order to achieve the effects which are linked to the method according to various embodiments.

The computer program can be implemented as a computer-readable instruction code in any suitable programming language such as, for example, in Java, C++ etc. The computer program can be stored on a computer-readable storage medium (CD-ROM, DVD, Blu-ray disk, interchangeable disk drive, volatile or nonvolatile memory, installed memory/processor etc.). The instruction code can program a computer or other programmable devices such as, in particular, a control device for an engine of a motor vehicle in such a way that the desired functions are carried out. In addition, the computer program can be provided in a network such as, for example, the Internet, from which it can be downloaded by a user when required.

Various embodiments may be implemented either by means of a computer program, i.e. a piece of software, or by means of one or more special electrical circuits, i.e. as hardware or in any desired hybrid form, i.e. by means of software components and hardware components.

It is to be noted that embodiments have been described with reference to different subject matters of the invention. In particular, some embodiments are described with method claims, and other embodiments are described with device claims. However, to a person skilled in the art reading this application it will become immediately clear that, unless stated otherwise, any desired combination of features which are associated with different types of subject matters of the invention is also possible in addition to a combination of features which are associated with one type of subject matter of the invention.

In addition it is to be noted that the embodiments described below represent only a restricted selection of possible embodiment variants. In particular it is possible to combine the features of individual embodiments with one another in a suitable way, and for a person skilled in the art a multiplicity of different embodiments are therefore considered to be obviously disclosed with the embodiment variants which are explicitly presented here.

The closing time detection method which is described in this application is based on the following physical effects which occur in the switch-off phase of an injection valve:

1. Firstly, the switching off of the voltage at the coil of the injection valve gives rise to a self-induction voltage which is limited by the recuperation voltage. The recuperation voltage is typically, in terms of absolute value, somewhat larger than the boost voltage. As long as the self-induction voltage exceeds the recuperation voltage, a current flow occurs in the coil, and the magnetic field in the coil is reduced. The chronological position of this effect is denoted by "I" in FIG. 7b.

2. A reduction in the magnetic force already occurs during the decay of the coil current. As soon as the spring prestress and the hydraulic force exceed the decreasing magnetic force owing to the pressure of the fuel to be injected, a resulting force, which accelerates the magnet armature together with the valve needle in the direction of the valve seat is produced.

3. If the self-induction voltage no longer exceeds the recuperation voltage, current no longer flows through the coil. The coil is electrically in what is referred to as the open coil mode. Owing to the ohmic resistances of the magnetic material of the magnet armature, the eddy currents induced during the reduction of the field of the coil decay exponentially. The decrease in the eddy currents leads in turn to a change in the field in the coil and therefore to the induction of a voltage. This induction effect leads to a situation in which a voltage value at the coil rises from the level of the recuperation voltage to zero volts in accordance with the profile of an exponential function. The chronological position of this effect is denoted by "III" in FIG. 7b.

4. Directly before the valve needle impacts in the valve seat, the magnet armature and valve needle reach their maximum speed. At this speed, the air gap between the coil former and the magnet armature becomes larger. Owing to the movement of the magnet armature and the associated increase in the air gap, the remnant magnetism of the magnet armature causes a voltage to be induced in the coil. The maximum induction voltage which occurs characterizes the maximum speed of the magnet armature (and also of the connected valve needle) and therefore the time of the mechanical closing of the valve needle. This induction effect which is caused by the magnet armature and the associated valve needle speed is superimposed on the induction effect owing to the decaying of the eddy currents. The chronological position of this effect is characterized by "IV" in FIG. 7b.

5. After the mechanical closing of the valve needle, a bouncing process typically occurs during which the valve needle is briefly deflected out of the closed position once more. Owing to the spring voltage and the applied fuel pressure, the valve needle is, however, pressed back into the valve seat again. The closing of the valve after the bouncing process is characterized by "V" in FIG. 7b.

The method described in this application is now based on detecting the closing time of the injection valve from the induced voltage profile in the switch-off phase. As is explained below in detail, this detection can be carried out with different methods.

Figure 1:
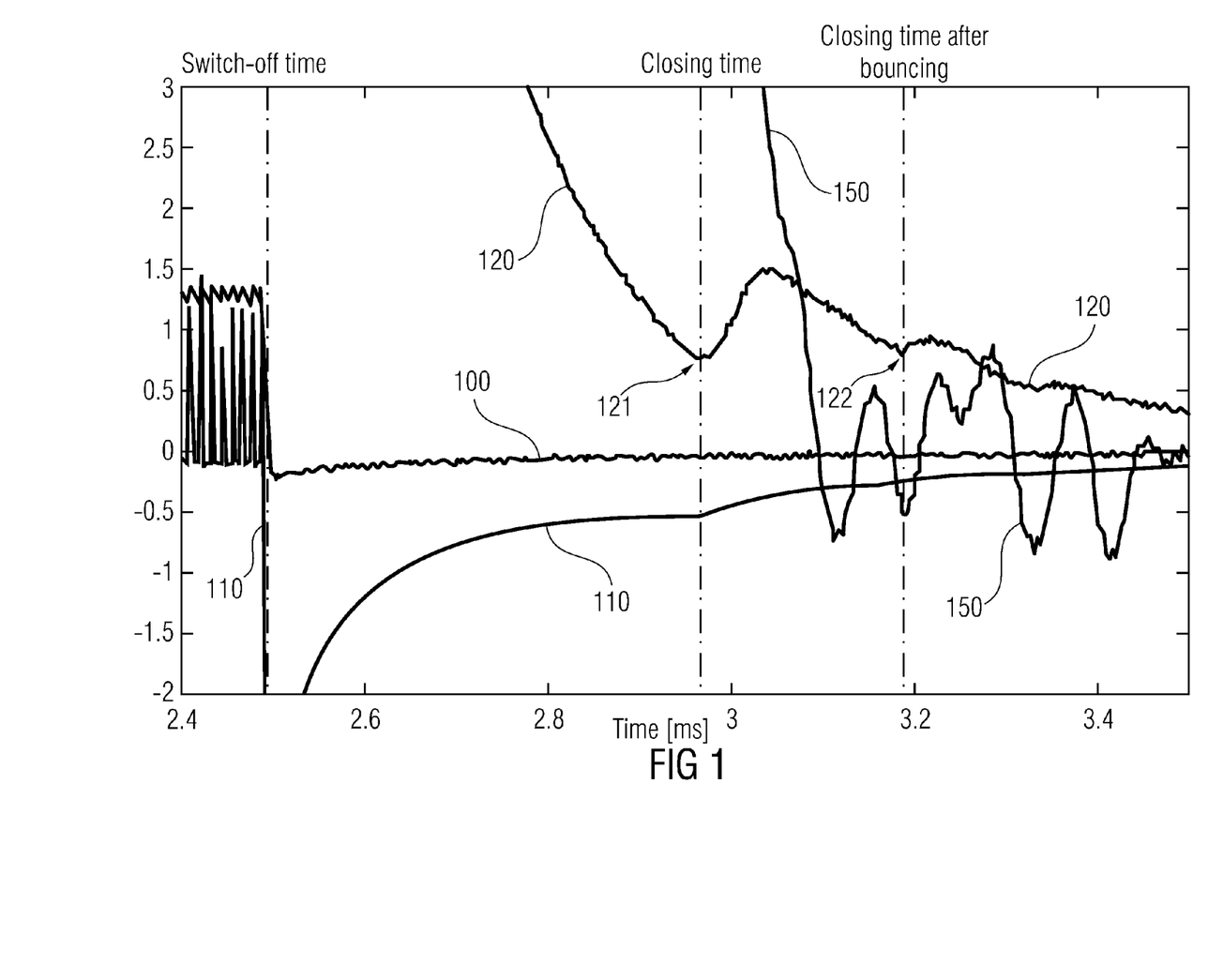
FIG. 1 shows detection of the closing time on the basis of a derivative over time of the voltage profile induced in the coil.

FIG. 1 shows various signal profiles at the end of the holding phase and in the switch-off phase. The transition between the holding phase and the switch-off phase occurs at the switch-off time, which is represented by a vertical dashed line. The current through the coil is represented by the curve provided with the reference symbol 100, in amperes as the unit. In the switch-off phase, an induced voltage signal 110 occurs as a result of superimposition of the induction effect owing to the speed of the magnet armature and the speed of the valve needle and the induction effect owing to the decaying of the eddy currents. The voltage signal 110 is represented in units of 10 volts. From the voltage signal 110 it is apparent that the speed of the increase in the voltage drops strongly in the region of the closing time before the speed of the increase in the voltage rises again owing to the bouncing back of the valve needle and the magnet armature. The curve which is provided with the reference symbol 120 represents the derivative over time of the voltage signal 110. In this derivative 120, the closing time can be seen at a local minimum 121. After the bouncing back process, a further closing time can be seen at a further minimum 122.

Even if it contributes only comparatively little to an understanding of various embodiments, FIG. 1 also shows a curve 150 which represents the fuel through-flow in units of grams per second. It is apparent that the measured fuel through-flow through the injection valve drops very quickly from the top shortly after the detected closing time. The chronological offset between the closing time which is detected on the basis of the evaluation of the actuation voltage and the time at which the measured fuel through-flow rate reaches the value zero for the first time results from the limited measurement dynamics during the determination of the fuel through-flow. Starting from a time of approximately 3.1 ms, the corresponding measurement signal 150 settles at the value zero.

In order to reduce the computing capacity necessary to carry out the described closing time detection method, the determination of the derivative 120 can also be carried out only within a limited time interval which contains the expected closing time.

If, for example, a time interval I with the width $2\Delta t$ about the expected closing time $t_{Close\_Expected}$, is defined, the following applies to the actual closing time $t_{Close}$:

$$I = [t_{Close\_Expected} - \Delta t, t_{Close\_Expected} + \Delta t]$$

$$U_{min} = \min\{dU(t)/dt | t \in I\}$$

$$t_{close} = \{t \in I | U(t) = U_{min}\} \quad (1)$$

As has already been indicated above, this approach can be extended in order to detect the renewed closing of the valve on the basis of a bouncing valve needle at a time $t_{Close\_Bounce}$. For this purpose, a time interval with the width $2\Delta t_{Bounce}$ about the time $t_{close\_bounce\_expected}$ of the expected closing after the first bouncing process is defined. The time $t_{Close\_bounce\_expected}$ is defined relative to the closing time $t_{Close}$ by means of $t_{Close\_bounce\_expected}$.

$$I_{Bounce} = [t_{close} + t_{Close\_Bounce\_Expected} - \Delta t_{Bounce}, t_{close} + t_{Close\_Bounce\_Expected} + \Delta t_{Bounce}]$$

$$U_{min\_Bounce} = \min\{dU(t)/dt | t \in I_{Bounce}\}$$

$$t_{close\_Bounce} = \{t \in I_{Bounce} | U(t) = U_{min\_Bounce}\} \quad (2)$$

Figure 2:
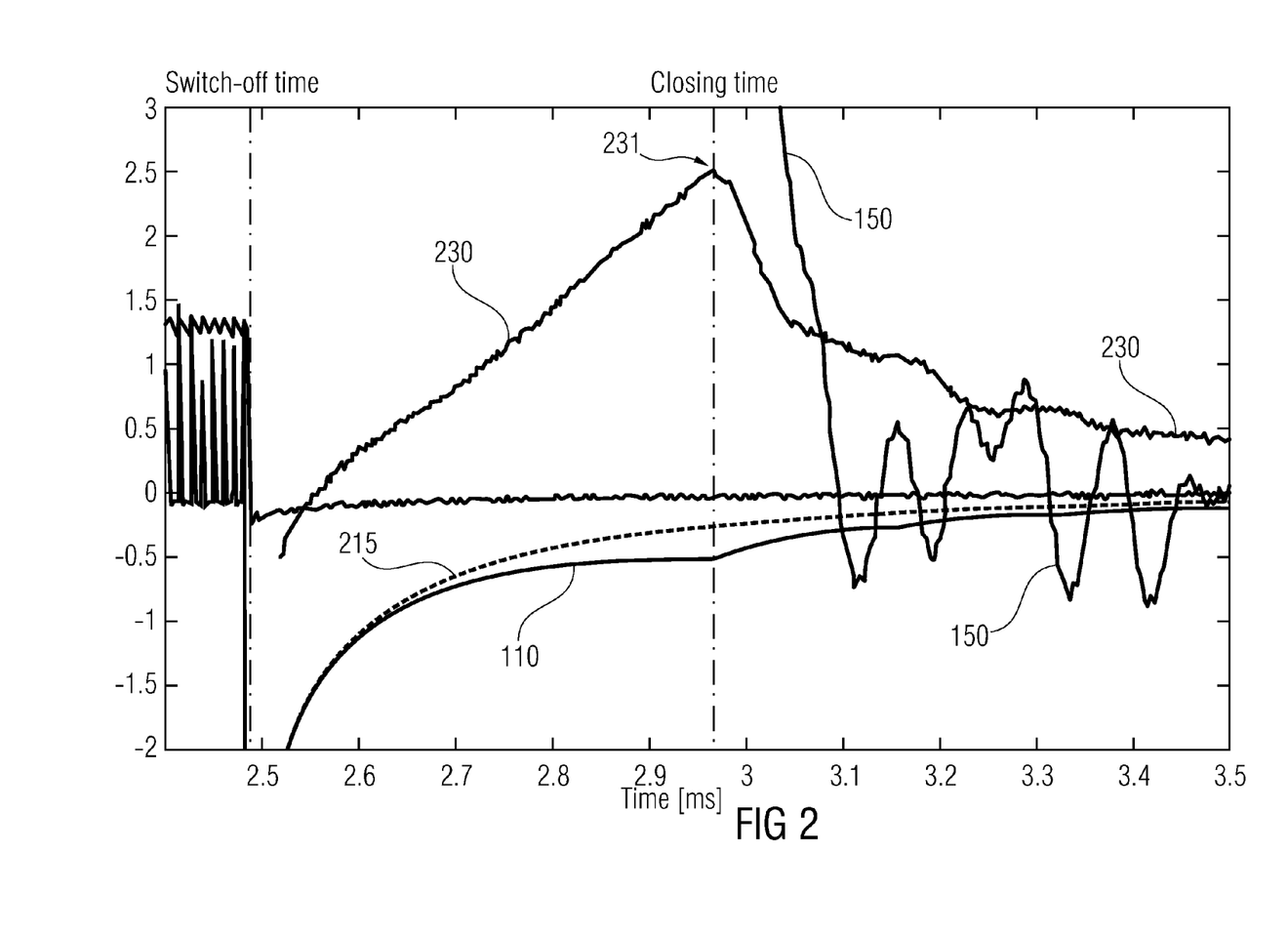
FIG. 2 shows detection of the closing time using a reference voltage profile, which characterizes the induction effect in the coil on the basis of the decaying of eddy currents in the magnet armature.

FIG. 2 shows detection of the closing time using a reference voltage profile which characterizes the induction effect in the coil owing to the decaying of eddy currents in the magnet armature. FIG. 2 also illustrates, as in FIG. 1, the end of the holding phase and the switch-off phase. The measured voltage profile 110, which is obtained from superimposition of the induction effect owing to the speed of the air gap and the identical speed of the valve needle and the induction effect owing to the decaying of the eddy currents, is the same as in FIG. 1. The coil current 100 is also unchanged compared to FIG. 1.

The idea is now to use a reference model to calculate the portion of the voltage signal 110 which is caused exclusively by the induction effect owing to the decaying of the eddy currents. A corresponding reference voltage signal is represented by the curve with the reference symbol 215. By determining the voltage difference between the measured voltage profile 110 and the reference voltage signal 215 it is possible to eliminate the induction effect owing to decaying eddy currents. The difference voltage signal 230 therefore characterizes the movement-related induction effect and is a direct measure of the speed of the magnet armature and of the valve needle. The maximum 231 of the difference voltage signal 230 characterizes the maximum speed of the magnet armature or of the valve needle, which is reached directly before the impacting of the needle on the valve seat. The maximum 231 of the difference voltage signal can therefore be used to determine the actual closing time $t_{close\_}$.

A simple phenomenological reference model is given below as an example. The reference model may be calculated online in the electronic engine controller. However, other physical model approaches are also conceivable.

The reference model is started (t=0) as soon as or after the self-induction voltage no longer exceeds the recuperation voltage but before $t_{Close\_expected}$ is reached, and therefore current no longer flows through the coil. The coil is then electrically in the open coil mode. The reference voltage profile 215 is measured for a reference injector on the injection test bench with a fuel pressure which is higher than the maximum opening pressure. The injector is hydraulically clamped in a closed position here despite the electrical actuation. The voltage profile which is measured here (not illustrated but identical to 215 allowing for model inaccuracies) in the switch-off phase therefore exclusively characterizes the voltage portion induced by exponentially decaying eddy currents.

The model parameter or parameters of the reference model can be subsequently optimized in the offline mode in such a way that the best possible correspondence with the measured voltage profile 215 is achieved. This may be done in a known fashion by minimizing a quality measure by means of a gradient searching method.

Generally, a time-dependent model with the parameters of a measured voltage start value $U_{Start}$ composed of the switch-off phase, the electrical resistance and the temperature behavior of the magnetic material $R_{MAG\_Material}(\ )$ in which the eddy currents flow as well as the current value $I_{hold}$ in the holding phase at the time of switching off are obtained for the modeled reference voltage $U_{INJ\_MDL}$. This can be described mathematically by the following equation:

$$U_{INJ\_MDL}(t) = f(U_{Start}, R_{MAG\_Material}(\vartheta), I_{hold}) \quad (3)$$

A simple implementation can be achieved by the following model. The time constant with the dependencies of the injection temperature and $I_{hold}$ is stored by a characteristic diagram in accordance with the exemplary embodiment illustrated here.

$$U_{INJ\_MDL}(t) = U_{start} \cdot [1 - \exp\{t/\tau(\vartheta, I_{hold})\}] \quad (4)$$

The closing time is obtained, as above, from the determination of the local maximum of the voltage difference 230 between the reference model 215 and the measured induction voltage 110. This evaluation can take place in turn in the time interval I with the width $2\Delta t_{Bounce}$ around the expected closing time $t_{Close\_expected}$.

$$I = [t_{Close\_Expected} - \Delta t, t_{Close\_Expected} + \Delta t]$$

$$U_{diff\_max} = \max\{U_{INJ\_MDL}(t) - U_{INJ\_MES}(t) | t \in I\}$$

$$t_{close} = \{t \in I | [U_{INJ\_MDL}(t) - U_{INJ\_MES}(t)] = U_{diff\_max}\} \quad (5)$$

Here, $U_{INJ\_MES}(t)$ stands for the measured voltage signal 110.

As already shown above, the algorithm can be extended by defining a suitable observation time interval in order to detect the renewed closing of the injector at the time $t_{Close\_Bounce}$ on the basis of a bouncing injector needle.

The profile of the reference voltage signal 215 can not only be calculated by means of a suitably programmed computer unit but can also be modeled with an electronic circuit, i.e. as hardware. Such a circuit for detecting the closing time is advantageously composed of three functional groups:

a) a generator circuit for generating the reference voltage signal 215, which then models the exponentially decaying coil voltage, induced by the eddy currents, in synchronism with the switch-on process. The generator voltage is also referred to below as a reference generator.

b) a subtraction circuit for forming differences between the coil voltage 110 and the reference voltage signal 215 in order to eliminate the voltage portion, induced by the eddy currents, of the voltage signal 110. As a result, essentially the movement-induced portion of the coil voltage remains.

c) an evaluation circuit for detecting the maximum 231 of the movement-induced portion of the coil voltage, which induces the closing time of the injector.

Figure 3:
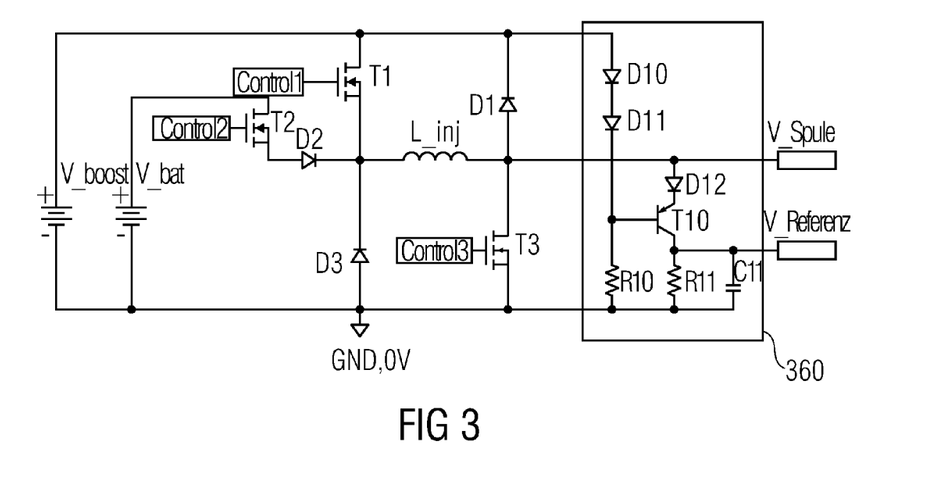
FIG. 3 shows an output stage which is provided for actuating a valve and which has a reference generator for generating the reference voltage profile.

FIG. 3 shows an output stage which is provided for actuating a valve and which has such a reference generator 360 for generating the reference voltage profile.

During the switch-off phase, the transistors T1, T2 and T3 are switched off by means of the actuation signals Control1, Control2 and Control3. The voltage generated by the magnetic flux in the injector coil L_inj causes the voltage at the recuperation diode D1 to rise until the recuperation diode D1 and a freewheeling diode D3 become conductive and a current flow is produced between the boost voltage V_boost and ground (GND).

It is to be noted that the coil voltage is represented as a differential voltage in FIGS. 1 and 2. Accordingly, the switch-off voltage has negative values. However, in the real circuit the left-hand side of the coil L_inj is approximately at ground here, while the right-hand side of the coil L_inj is at a positive voltage value.

In the reference generator 360, the coil voltage V_Spule is fed to the emitter of an npn-type transistor T10 via a diode D12. The base potential of said npn-type transistor T10 is determined by means of a voltage divider, which has the diodes D10 and D11 and the resistor R10, as having a value of approximately 1.4 V below the voltage of V_boost. As long as the coil voltage V_Spule is significantly lower than V_boost, T10 is de-energized owing to the diode D12 which is then operated in the off direction, with the result that the voltage at the resistor R11 is 0 V. During the switch-off phase, the coil voltage V_Spule rises to V_boost plus the flux voltage from the diode D1. As a result, the transistor T10 is switched on and charges a capacitor C11, with the result that the voltage V_Referenz rises quickly to the value of V_boost. The charge current through the transistor T10 is significantly higher here than the discharge current through the resistor R11. If the coil is discharged to such an extent that its voltage drops below V_boost, T10 switches off and the capacitor C11 is then discharged through the resistor R11. Given a suitable selection of the component values, the discharge curve has here the desired exponentially decaying profile which occurs in synchronism with the profile of the coil voltage V_Spule.

Figure 4:
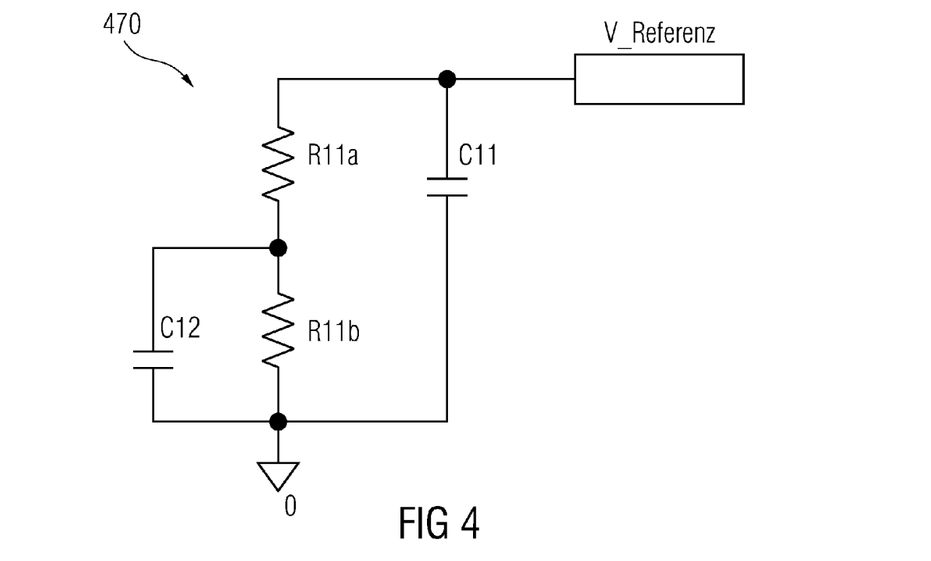
FIG. 4 shows an extension for the reference generator illustrated in FIG. 3, for the purpose of generating reference voltage profiles of a higher order.

FIG. 4 shows an extension of the reference generator illustrated in FIG. 3, for generating reference voltage profiles of a higher exponential order. Here, the components R11 and C11 which are illustrated in FIG. 3 and which are both connected between V_Referenz and ground are replaced by the supplementary circuit 470 which is illustrated in FIG. 4. The supplementary circuit 470 has a capacitor C11, two resistors R11a and R11b which are connected in parallel in series with the latter, and a capacitor C12 which is connected in parallel with R11b.

Figure 5:
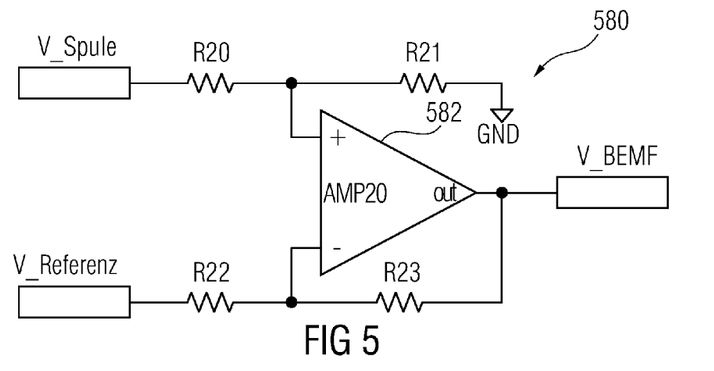
FIG. 5 shows a difference amplifier for forming the difference between an induced coil voltage and a reference voltage profile.

The formation of differences between the coil signal and the reference signal can be carried out with an operational amplifier 582 which is connected as a differential amplifier 580. Such a differential amplifier 580 is illustrated in FIG. 5. The differential amplifier 580 has four resistors R20, R21, R22 and R23, which are each placed in contact with the positive or negative input of the operational amplifier 582. The movement-induced coil voltage V_BEMF, which is characterized by the reference symbol 230 in FIG. 2, is available at the output of the differential amplifier.

Figure 6:
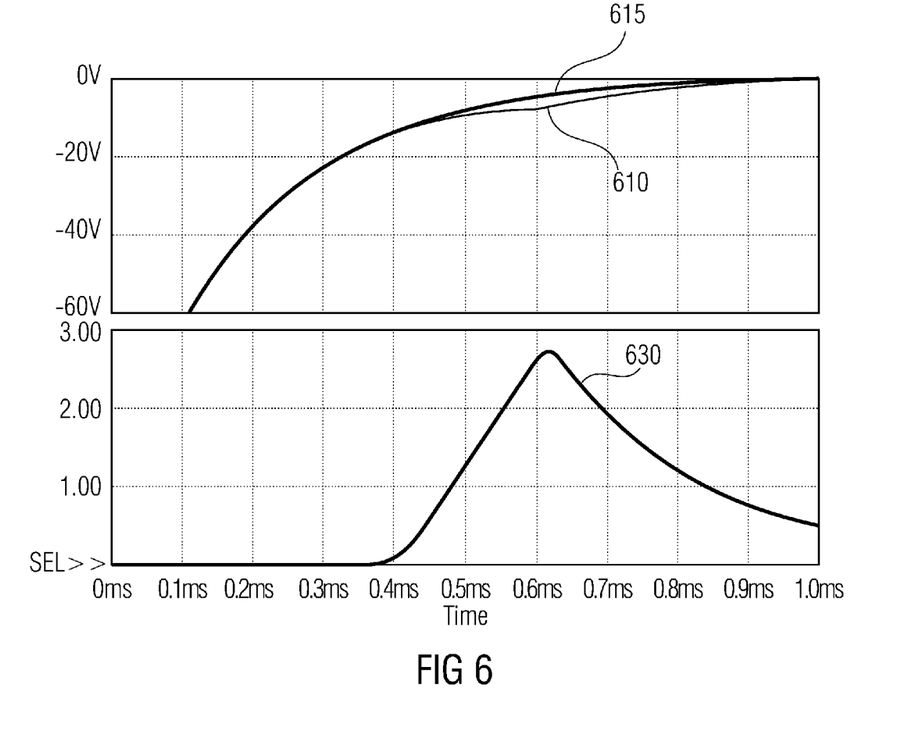
FIG. 6 shows the time profiles of an induced coil voltage, of a reference voltage and of the difference between the induced coil voltage and the reference voltage.

FIG. 6 shows the time profiles of the induced coil voltage 610 (V_Spule), of the reference voltage 615 (V_Referenz) and of the differential voltage 630 (V_BEMF) between the induced coil voltage 610 and the movement-induced reference voltage 610.

The differential voltage 630 (V_BEMF) can be evaluated, for example, with a circuit which is explained in detail in the German laid-open patent application DE 10 2005 044 886 A1 (see FIGS. 7 and 8). In order to evaluate the differential voltage 630 (V_BEMF) generated here, this said voltage can be applied directly to the base of the transistor T1 of the known electronic evaluation circuit described in FIGS. 7 and 8 of DE 10 2005 044 886 A1. In the present application, the resistors R1-R4 and C1 and D3 of this known evaluation circuit are omitted. Further modifications to this known evaluation circuit are not necessary.

It is to be noted that the circuits described in this document are only possible exemplary embodiments in order to explain the method of functioning. Of course, other circuit variants are also conceivable.

The method described in this document can also be used to detect the closing of the control valve in a diesel injection valve with a coil drive. Furthermore, the described method can also be used to detect the closing of the valve needle in a direct-driven diesel injection valve with a coil drive.

The invention claimed is:

1. A method for determining a closing time of a valve having a coil drive comprising:
    switching off a current flow through a coil of the coil drive, with the result that the coil is de-energized,
    sensing, a voltage which is induced in the de-energized coil, by decaying eddy currents in a magnetic circuit of the coil drive and by a movement of the magnet armature relative to the coil,
    measuring a voltage profile of the sensed voltage over time,
    evaluating a time interval of the measured voltage profile in which the voltage is the continuously increasing and which includes an expected closing time of the valve, and
    determining the closing time of the valve based on the evaluated time interval of the measured voltage profile.

2. The method according to claim 1, wherein the evaluated time interval comprises a further expected closing time at which the valve is dosed again after a bouncing process of the valve needle and of the associated magnet armature.

3. The method according to claim 1, wherein the evaluation comprises calculating and evaluating the derivative over time, $dV_{measured}/dt$, of the measured voltage profile of the voltage induced in the coil.

4. The method according to claim 1, wherein the evaluation comprises comparing the measured voltage profile of the voltage induced in the coil with a reference voltage profile.

5. The method according to claim 1, wherein the reference voltage profile is determined by sensing the voltage induced in the de-energized coil while the magnet armature is secured in the closed position of the valve, after the valve has been actuated electrically as in real operation.

6. The method according to claim 4, wherein the reference voltage profile is described by parameters of a mathematical reference model.

7. The method according to claim 1, wherein the evaluation comprises comparing a derivative over time, $dV_{measured}/dt$, of the measured voltage profile of the voltage induced in the coil with a derivative over time of the reference voltage profile, $dV_{measured}/dt$.

8. The method according to claim 1, wherein the reference voltage profile is modeled by an electronic circuit.

9. A device for determining a closing time of a valve having a coil drive comprising
- a switch-off unit configured to switch off a current flow through a coil of the coil drive, with the result that the coil is de-energized,
- a sensing unit configured to sense a voltage induced in the de-energized coil by decaying eddy currents in a magnetic circuit of the coil drive and by a movement of the magnet armature relative to the coil, and to measure a voltage profile of the sensed voltage over time, and
- an evaluation unit configured to evaluate a time interval of the measured voltage profile in which the voltage is the continuously increasing and which includes an expected closing time of the valve, and to determine the closing time of the valve based on the evaluated time interval of the measured profile.

10. The method according to claim 1, wherein the valve is a direct injection valve for an engine of a motor vehicle.

11. A computer program product for determining a closing time of a valve having a coil drive comprising a non-transitory computer readable medium storing instructions which when executed by a processor, cause the following steps to be performed:
- switching off a current flow through a coil of the coil drive, with the result that the coil is de-energized,
- sensing a voltage which is induced in the de-energized coil by decaying eddy currents in a magnetic circuit of the coil drive and by a movement of the magnet armature relative to the coil,
- measuring a voltage profile of the sensed voltage over time,
- evaluating a time interval of the measured voltage profile in which the voltage is the continuously increasing and which includes an expected closing times of the valve, and
- determining the closing time of the valve based on the evaluated time interval of the measured voltage profile.

12. The computer program product according to claim 11, wherein the evaluated time interval comprises a further expected closing time at which the valve is closed again after a bouncing process of the valve needle and of the associated magnet armature.

13. The computer program product according to claim 11, wherein the evaluation comprises calculating and evaluating the derivative over time, $dV_{measured}/dt$, of the measured voltage profile of the voltage induced in the coil.

14. The computer program product according to claim 11, wherein the evaluation comprises comparing the measured voltage profile of the voltage induced in the coil with a reference voltage profile.

15. The computer program product according to claim 11, wherein the reference voltage profile is determined by sensing the voltage induced in the de-energized coil while the magnet armature is secured in the closed position of the valve, after the valve has been actuated electrically as in real operation.

16. The computer program product according to claim 14, wherein the reference voltage profile is described by parameters of a mathematical reference model.

17. computer program product according to claim 11, wherein the evaluation comparing a derivative over time, $dV_{measured}/dt$, of the measured voltage profile of the voltage induced in the coil with a derivative over time of the reference voltage profile, $dV_{reference}/dt$.

18. The computer program product according to claim 11, wherein the reference voltage profile is modeled by an electronic circuit.

* * * * *